Nov. 11, 1969  G. W. BEESLEY  3,477,795
BLADED ROTOR FOR A FLUID FLOW MACHINE
Filed April 25, 1968

Inventor
Gilbert William Beesley
By
Cushman, Darby, Cushman
Attorneys

United States Patent Office 3,477,795
Patented Nov. 11, 1969

3,477,795
BLADED ROTOR FOR A FLUID
FLOW MACHINE
Gilbert William Beesley, Derby, England, assignor to
Rolls-Royce Limited, Derby, England, a British
company
Filed Apr. 25, 1968, Ser. No. 724,132
Claims priority, application Great Britain, May 1, 1967,
20,113/67
Int. Cl. F01d 5/14
U.S. Cl. 416—191                                3 Claims

ABSTRACT OF THE DISCLOSURE

A gas turbine engine bladed rotor has each blade provided intermediate its ends with two circumferentially projecting clapper portions which abut but which are not secured to respective clapper portions of the adjacent blades in planes which are inclined to the axis of rotation of the rotor in opposite senses.

---

This invention relates to bladed rotors for fluid flow machines such as gas turbine engines.

Bladed rotors in a gas turbine engine, particularly the leading rotor stages of axial flow compressors, are prone to damage due to ingestion by the engine of foreign bodies such as birds when the engine is in operation. When such a body impinges on a bladed-rotor which is rotating at high speed, the initial impact is usually imparted to one of the blades of the rotor, and is such as to apply not only a bending moment but also a large twisting moment to the blade about its longitudinal axis. The present invention provides a construction of bladed rotors which not only accommodates the bending moments imparted to a blade by the impact of a foreign body, as in conventional clappered blades, but also enables the large twisting moments so imparted to the blade to be distributed, to some extent, between the remaining blades of the rotor.

According to the present invention there is provided a bladed rotor for a fluid flow machine such as a gas turbine engine comprising a plurality of blades, two circumferentially projecting clapper portions being provided intermediate the ends of each blade, the clapper portions being in abutting relationship with, but not secured to, respective clapper portions of the two respective adjacent blades in respective abutment planes which are inclined to the axis of rotation of the rotor in opposite senses, the clapper portions of each blade being substantially equidistant from the leading and trailing edges of the blade and having an axial extent which is at least one-third of the axial extent of the respective blade.

Preferably the clapper portions of each blade comprise respective part-cylindrical plate members secured to or formed integrally with the aerofoil surfaces of the respective blade.

The invention also provides an axial flow compressor for a gas turbine engine, at least the first rotor stage of the compressor comprising a bladed rotor as described above.

The invention will be described, merely by way of example, with reference to the accompanying drawings, in which.

Figure 1:
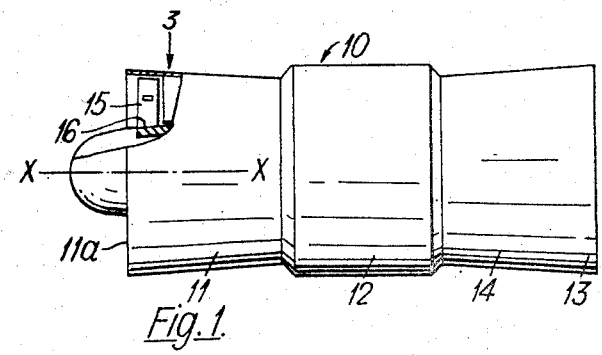
FIGURE 1 is a diagramatic side view, partly in section, of a gas turbine engine incorporating the invention.

Referring to FIGURE 1, a gas turbine engine 10 for mounting in an aircraft has an axial flow compressor 11 provided at its upstream end with an annular air intake 11a. The compressor 11 supplies compressor air to combustion equipment 12, the exhaust gases from which are expelled through an exhaust duct 13 after passing through a turbine 14 which drives the compressor 11. The gas turbine engine 10 may be of any conventional type.

The axial flow compressor 11 comprises alternate rotor and stator stages in flow series, the first stage, at the upstream end of the compressor 11, comprising a bladed rotor 15, shown diagrammatically in FIGURE 1. Thus in this example, no guide vanes or stator blades are provided upstream of the rotor 15, so that the rotor 15 is particularly vulnerable to foreign bodies such as birds entrained in the air entering the air intake 11a. Rotor stages disposed downstream of stator stages or inlet guide vanes are also, however, vulnerable in this way.

Figure 2:
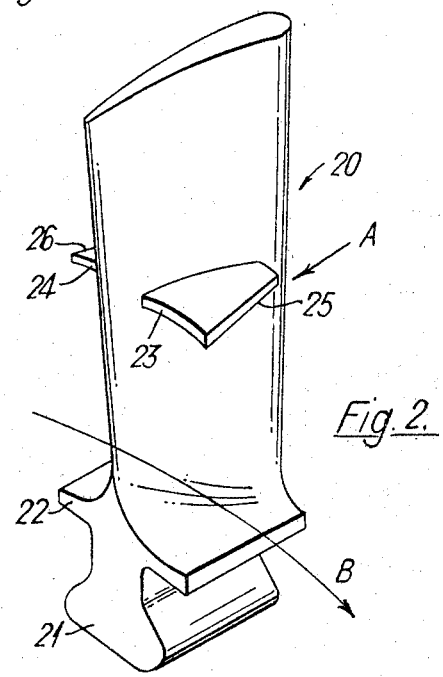
FIGURE 2 is a perspective view of a single blade forming part of a compressor rotor in the engine of FIGURE 1.

The bladed rotor 15 comprises a rotor disc or drum 16 to which is secured a plurality of radially extending rotor blades 20, one of which is shown in FIGURE 2. The blade 20 has a blade root 21 and integral platform portion 22 at its radially inner end. The platform portions 22 of adjacent blades 20 abut each other when the blades 20 are assembled in the rotor 15 to provide a continuous annular platform forming part of the inner surface of the compressor flow duct. Air impinges on the rotor blade 20 from the intake 11a in the direction of arrow A, the blade 20 being driven by rotation of the rotor 15 about its axis X—X in the direction of arrow B.

Figure 3:
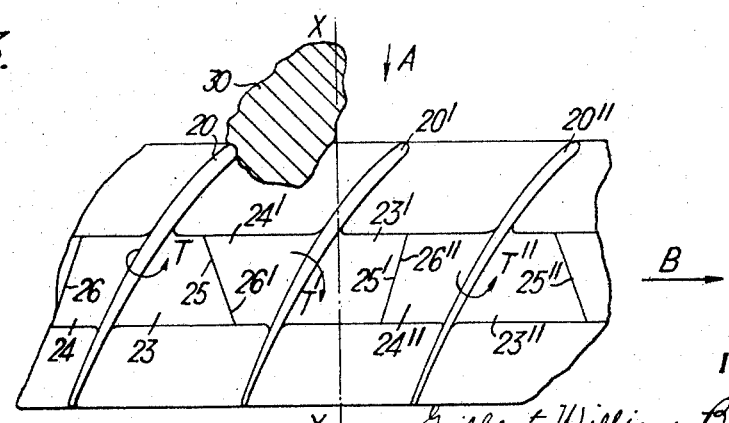
FIGURE 3 is a fragmented developed view of a bladed rotor according to the invention, viewed from the direction of arrow 3 in FIGURE 1.

The blade 20 is provided or formed integrally intermediate its ends with two clapper portions 23, 24 which extend circumferentially from the high pressure and low pressure aerofoil surfaces respectively of the blade 20. Each clapper portion 23, 24 comprises a part-cylindrical plate, the clapper portions lying on the surface of a cylinder whose axis coincides with the axis of rotation X—X of the rotor 15 and has an axial extent which is substantially equal to one-third of the total axial extent of the respective blade 20 (FIGURE 3). Each clapper portion 23, 24 is disposed substantially equidistantly from the leading and trailing edges of the blade 20.

The clapper portions 23, 24 terminate in respective abutment faces 25, 26 which are inclined to the axis of rotation of the rotor in opposite senses (FIGURE 3). The abutment faces 25, 26 of the respective clapper portions of the adjacent blades 20 are such that respective clapper portions of the two respective adjacent blades abut the two abutment faces 25, 26 of the blade 20. Thus referring to FIGURE 3, the blade 20 is shown in position with two adjacent blades 20′, 20″. The blades 20′, 20″ have respective clapper portions 23′, 24′ and 23″, 24″ and are such that the clapper portions 23, 24′ and 23′, 24″ of adjacent blades 20, 20′ and 20′, 20″ abut each other at the respective faces 25, 26′ and 25′, 26″ in respective radial planes which are inclined to the axis of rotation X—X of the rotor 15 in opposite senses. It will be seen that alternate blades of the rotor are of identical construction. Thus in FIGURE 3 blades 20 and 20″ are identical. Clearly the rotor 15 shown in the drawings must have an even number of blades 20.

If, for example a foreign body 30 (FIGURE 3) is entrained in the air entering the compressor 11, it may strike the leading edge of a blade 20, the relative velocity of the body 30 and blade 20 having a substantial component circumferentially in the direction of arrow B by virtue of the rotation of the bladed rotor 15. The impact force of the body 30 on the leading edge of the blade 20 will exert a twisting moment on the blade 20 about its longitudinal axis, in the direction (anticlockwise as viewed in FIGURE 3) of the arrow T in FIGURE 3. The inclined abutting faces 25, 26′ of the adjacent clapper portions 23, 24' will transmit a clockwise twisting moment T' to the adjacent blade 20'. The blade 20' will in turn transmit an anticlockwise twisting moment T" to the adjacent blade 20" through the abutting clapper portions 23', 24". Of course, it will be appreciated that depending upon where the body 30 strikes the blade 20, i.e., it may strike the blade on either of its faces or on its leading edge, the twisting moment may be in either direction about the longitudinal axis of the blade. In this way the impact twisting moment T is transmitted to all the blades 20 of the bladed rotor 15 thereby distributing the impact load throughout the bladed rotor 15.

I claim:

1. A bladed rotor for a fluid flow machine, such as a gas turbine engine comprising: a plurality of blades, two circumferentially projecting rigid clapper portions being provided intermediate the ends of each blade, said clapper portions of each blade being in abutting relationship with, but not secured to, respective clapper portions of two respective adjacent blades in respective abutment planes which are inclined to the axis of rotation of the rotor in opposite senses, the clapper portions of each blade being substantially equidistant from the leading and trailing edges of the blade and having an axial extent which is at least one-third of the axial extent of the respective blade so that when one of said blades is struck by a foreign object to cause an impact load therein having a bending moment about the longitudinal axis of the rotor and/or a twisting moment in either direction about the longitudinal axis of the one said blade, the rigid clapper portions of the one said blade cooperating with the abutting clapper portions of the adjacent blades to resist said bending moment about the longitudinal axis of the rotor and/or to transmit said twisting moment in either direction about the longitudinal axis of the one said blade successively to the remaining blades of the rotor, whereby the impact load is distributed throughout the blades of the rotor.

2. A gas turbine engine comprising: an axial flow compressor, combustion means, and turbine means in flow series; said axial flow compressor having at least a first rotor stage comprising a bladed rotor, said bladed rotor having a plurality of blades, two circumferentially projecting rigid clapper portions being provided intermediate the ends of each blade, said clapper portions of each blade being in abutting relationship with, but not secured to, respective clapper portions of the two respective adjacent blades in respective abutment planes which are inclined to the axis of rotation of the rotor in opposite senses, the clapper portions of each blade being substantially equidistant from the leading and trailing edges of the blade and having an axial extent which is at least one-third of the axial extent of the respective blade, so that when one of said blades is struck by a foreign object to cause an impact load therein having a bending moment about the longitudinal axis of the rotor and/or a twisting moment in either direction about the longitudinal axis of the one said blade, the rigid clapper portions of the one said blade cooperate with the abutting clapper portions of the adjacent blades to resist said bending moment about the longitudinal axis of the rotor and/or to transmit said twisting moment in either direction about the longitudinal axis of the one said blade successively to the remaining blades of the rotor, whereby the impact load is distributed throughout the blades of the rotor.

3. A bladed rotor as claimed in claim 1 in which the clapper portions of each blade comprise respective part-cylindrical plate members secured to or formed integrally with the aerofoil surfaces of the respective blade and disposed in a common plane perpendicular to the axis of the blade.

References Cited

UNITED STATES PATENTS 2,198,784  4/1940  Mikina.
3,216,699  11/1965  Schoenborn.

EVERETTE A. POWELL, JR., Primary Examiner

U.S. Cl. X.R.

416—193